United States Patent [19]

Tyler et al.

[11] 4,027,202

[45] May 31, 1977

[54] VOLTAGE PROTECTION CIRCUIT

[75] Inventors: Hugh J. Tyler, Santa Ana; Dennis E. Newell, El Segundo, both of Calif.

[73] Assignee: Robertshaw Controls Company, Richmond, Va.

[22] Filed: Dec. 19, 1975

[21] Appl. No.: 642,220

[52] U.S. Cl. .............................. 361/33; 307/236; 307/350; 361/92

[51] Int. Cl.² ..................................... H02H 7/08

[58] Field of Search .............. 317/13 R, 13 B, 31, 317/27 R, 36 TD, 33 VR; 307/235 R, 236; 323/20

[56] References Cited

UNITED STATES PATENTS

| | | |
|---|---|---|
| 3,522,482 | 8/1970 | Thompson .......................... 317/31 |
| 3,740,738 | 6/1973 | Kosanovich et al. ................. 317/31 |
| 3,851,216 | 11/1974 | Clarke et al. ..................... 317/13 R |
| 3,875,463 | 4/1975 | Reuter et al. ..................... 317/13 R |

*Primary Examiner*—Gerald Goldberg
*Attorney, Agent, or Firm*—O'Brien & Marks

[57] ABSTRACT

In a protection circuit for a device such as a motor, the unused half or a dedicated half of an AC signal on the secondary of an isolation transformer is sensed to disconnect the AC line from the device if the line voltage is abnormal, such as being too low. Conveniently the protection circuit is employed in a complete motor protection system which may include a thermal protection circuit, a low oil pressure protection circuit, and/or a time delay circuit to prevent start-up too soon after shut-down.

6 Claims, 3 Drawing Figures

VOLTAGE PROTECTION CIRCUIT

BACKGROUND OF THE INVENTION

1. Field of the Invention:

The invention relates to voltage protection circuits used to protect device, such as motors, from abnormal line voltage, such as low voltage conditions, which can cause damage to the device if allowed to operate with such abnormal line voltage conditions.

2. Description of the Prior Art:

The prior art as exemplified in U.S. Pats. Nos. 3,663,958, 3,740,738, 3,836,790 and 3,875,463 contains a number of abnormal AC line voltage detecting circuits some of which are suitable for protecting motors against low or high line voltage conditions. Generally the prior art protection circuits have one or more deficiencies such as being excessively expensive, not being adaptable for inclusion with other protection circuits within a single protective system, being subject to excessive variation in operating characteristics, being unreliable, and the like.

SUMMARY OF THE INVENTION

The invention is summarized in that a protection circuit for a device having input switching means for connecting the device to an AC source includes a lower power transformer having a primary winding and a secondary winding, the primary winding adapted to be coupled to the AC source, first half-wave rectifier means coupled to the secondary winding and responsive to one half of the AC power on the secondary winding for producing a first single polarity voltage, second half-wave rectifier means coupled to the secondary winding and responsive to the other half of the AC power on the secondary winding for producing a secondd single polarity voltage which has a magnitude corresponding to the voltage of the AC source, sensing means energized by the first half wave rectifier means and having an input connected to the second half-wave rectifier means for sensing a deviation of the magnitude of the second single polarity voltage from a predetermined voltage, and means operated by the sensing means sensing the deviation for operating the switching means to disconnect the device from the AC source.

An object of the invention is to construct a reliable and relatively inexpensive protection circuit which senses an abnormal line voltage condition and disconnects a device from the line voltage to prevent damage to the device due to abnormal voltage condition.

Another object of the invention is to utilize the unloaded half-wave from a low power transformer to provide a voltage proportional to the line voltage for operating the protection circuit.

One advantage of the present invention is that the voltage protection circuit can be added to motor protection system which includes other protective circuits such as thermal protection, low oil pressure protection, and/or a time delay to prevent start-up too soon after shut-down, without requiring a great number of new components and without being effected by operation of the remaining portion of the circuit.

Another advantage is that certain components, such as the power supply and the output devices, can be shared with other protective circuits, thus resulting in fewer parts, high reliability and lower costs of construction.

Other objects, advantages and features of the invention will become apparent from the following description of the preferred embodiment taken in conjunction with the accompanying drawings.

BRIEF DESCRIPTION OF THE DRAWINGS

FIG. 2A illustrates therewith the entire circuit in the circuit unit of FIG. 1.

DESCRIPTION OF THE PREFERRED EMBODIMENT

Figure 1:
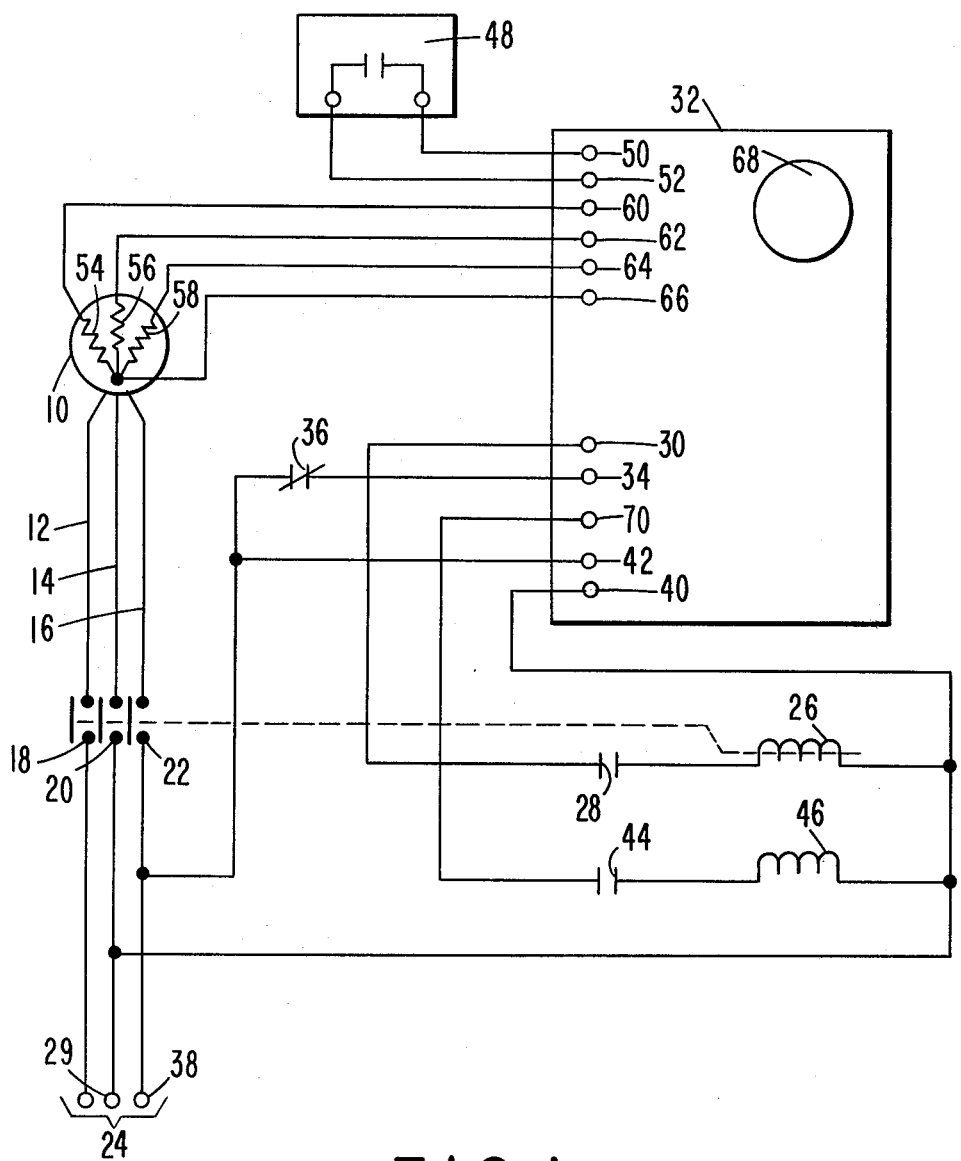
FIG. 1 is a diagram of a motor protection system in accordance with the invention.

As shown in FIG. 1 the invention is embodied in a load control or protection circuit such as a motor protection circuit suitable for protecting a device, such as a compressor motor 10 in a refrigeration or cooling system. The device 10 is adapted to be energized by electrical power on lines 12, 14 and 16 which are connected in series with respective normally open contacts 18, 20 and 22 to an AC source such as a three phase power source 24. The contacts 18, 20 and 22 are part of a contactor which also includes a winding 26 which when energized operated the contactor to close the contacts 18, 20 and 22. The contactor winding 26 is connected in a circuit which includes an electrial circuit unit 32 and various other controls, such as switches, for controlling the operation of the device 10.

In the circuit illustrated in FIG. 1 the winding 26 is connected in series with contacts 28 between one terminal 29 of the power source and a terminal 30 of the unit 32. The contacts 28 are normally closed contacts of a low pressure switch responsive to a low pressure on the suction side of the compressor. A second terminal 34 of the unit 32 is connected by contacts 36 to another terminal 38 of the source 24. The contacts 36 are normally closed contacts of a high pressure switch responsive to excessive high pressure in the output of the compressor. The unit 32 also has terminals 40 and 42 which are connected to the respective terminals 29 and 38 of the source 2. Although the terminals 40 and 42 and the circuit containing terminals 30 and 34 are shown directly connected to there power terminals 29 and 38 other coupling means such as transformers and the like may be used to couple the terminals 40 and 42 and the circuit containing terminals 30 and 34 to the line voltage to the motor. A series connection of room temperature relay contacts 44 and a solenoid 46 of a valve is connected between a terminal 70 in the unit 32 and the power source terminal 29. The room temperature relay contacts 44 are such as to be operated by a temperature responsive device located in the chamber being cooled and serves to thermostatically control the operation of the motor 10. The valve controlled by the solenoid 46 is designed to control refrigerant flow in the suction line to the compressor. A normally open lubricating fluid or oil pressure sensing switch 48 is connected between terminals 50 and 52 of the unit 32. Three thermal sensing resistances, such as lengths 54, 56 and 58 of positive temperature coefficient wires embedded in respective windings of the motor 10 each have one end connected to the respective terminals 60, 62 and 64 of the unit 32 and have their other end commonly joined to a terminal 66 of the unit 32. The unit 32 also has a push button oil reset switch 68.

Figure 2A:
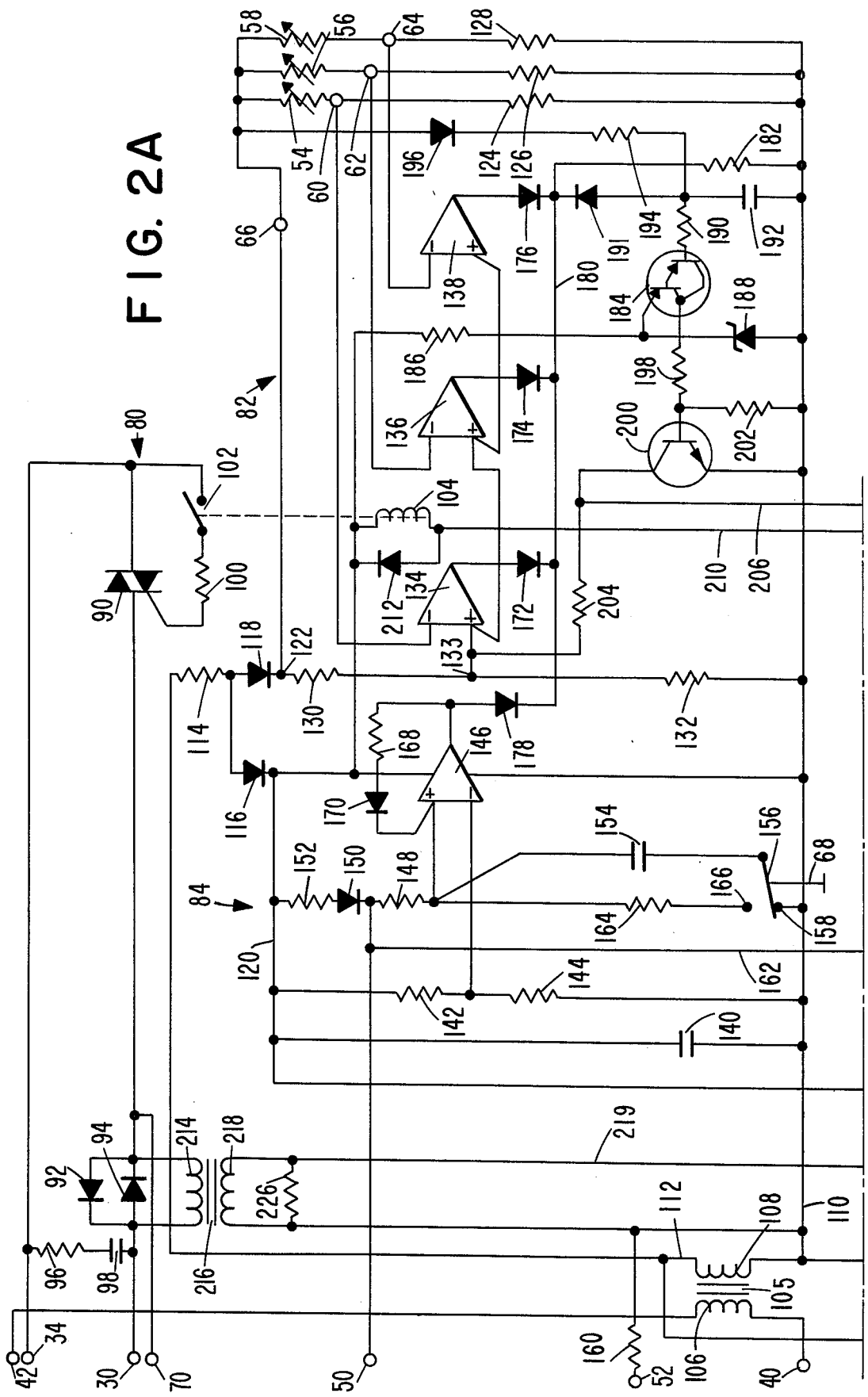
FIG. 2A is a circuit diagram of a first portion of the circuitry contained within a circuit unit of the motor protection system of FIG. 1.
Figure 2B:
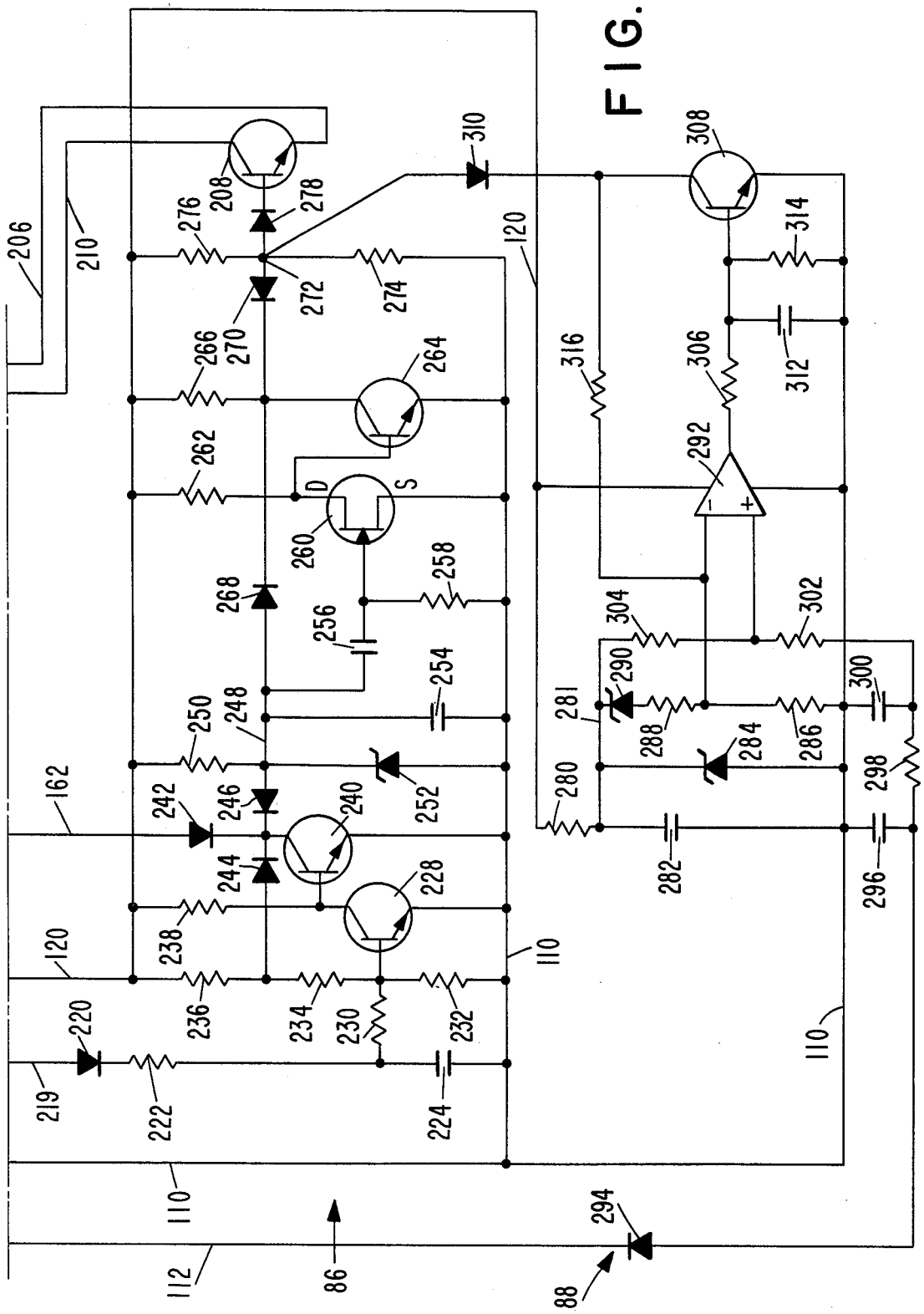
FIG. 2B is a circuit diagram of a second portion of the circuit contained in the circuitunit of FIG. 1 and when placed directly beneath

The circuitry within the unit 32 is illustrated in FIGS. 2A and 2B which includes a load or motor contactor energizing circuit, indicated generally at 80, a thermal protection circuit indicated generally at 82, an oil pressure protection circuit indicated generally at 84, a delay after break circuit indicated generally at 86, and a low voltage protection circuit indicated generally at 88.

In the motor contactor energizing circuit 80, a triac 90 is connected in series with a parallel arrangement of oppositely poled diodes 92 and 94 and a transformer primary winding 214 between the terminals 30 and 34. The terminal 70 is connected to the junction between the diodes 92 and 94 and the traic 90. A series circuit including a resistance 96 and a capacitance 98 is connected across the terminals 30 and 34; the resistance 96 and the capacitance 98 having values selected to limit the rate of voltage rise across the traic 90 to reduce the chance of false triggering of the traic 90. The control electrode of the traic 90 is connected to the terminal 34 by a resistance 100 connected in series with normally open contacts 102 of a relay which has a winding 104 for operating the contacts 102.

A low power isolation transformer 105 has a primary winding 106 connected across the terminals 40 and 42 and a secondary winding 108 which is connected to one end to a common node or junction 110 and at its other end to a power node or junction 112. A resistance 114 is connected between the power node 112 and the anodes of diodes of rectifiers 116 and 118 which have their cathodes connected to respective unipolarity junctions 120 and 122. A filter capacitance 140 is connected across the unipolarity junction 120 and the common junction 110. The transformer 105 is selected to provide a suitable low voltage power on its secondary winding to supply adequate unipolarity power on the junctions 120 and 122 sufficient to operate the circuits 82, 84, 86 and 88 from only the positive half of the AC power signal from the junction 112.

In the thermal protection circuit 82, the terminal 66 is connected to the unipolarity power junction 122 while resistances 124, 126 and 128 have one ends connected to the respective terminals 60, 62 and 64 with their other ends connected to the common junction 110. A voltage dividing circuit including series connected resistances 130 and 132 is connected across the unipolarity power junction 122 and the common junction 110 and has an intermediate junction 133 between the resistances 130 and 132 connected to the noninverting inputs of operational amplifiers 134, 136 and 138 which have their respective inverting inputs connected to the respective junctions 60, 62 and 64. The valves of the thermally responsive resistances 54, 56 and 58, the resistances 124, 126 and 128, and the resistances 130 and 132 are selected that at normal temperatures sensed by the resistances 54, 56 and 58 the inverting inputs of the operational amplifiers 134, 136 and 138 are positive with respect to their non-inverting inputs, and at excessively high temperatures sensed by one or more of the resistances 54, 56 and 58 the inverting inputs of the respective operational amplifiers 134, 136 and 138 are negative with respect to their non-inverting inputs.

In the oil pressure protection circuit 84, a pair of resistances 142 and 144 are connected in series across the unipolarity junction 120 and the common junction 110 and have their intermediate junction connected to the inverting input of an operational amplifier 146 which together with the operational amplifiers 134, 136 and 138 may form a quad amplifier integrated circuit which has its power terminals connected to the junctions 120 and 110. A timing resistance 148 is connected at one end to a cathode of a diode 150 which has its anode connected by a resistance 152 to the junction 120. The other end of the timing resistance 148 is connected to one plate of a timing capacitance 154 which has its other plate connected to the contact arm 156 of the switch 68 which has its normally closed contact joined to the common terminal 110. The terminal 50 is connected to the junction between the diode 150 and the resistance 148 along with a line 162 from the delay after break circuit 86 while the terminal 52 is connected by resistance 160 to the common junction 110. The values of the resistances 142 and 144 as well as the values of the resistance 152 and the timing resistance 148 and the capacitance 154 are selected to maintain the non-inverting input of the amplifier 146 negative with respect to the inverting input when the pressure switch between the terminals 50 and 52 is closed or the junction between the diode 150 and the resistance 148 is held low by a signal on the line 162 to produce a low output on the amplifier 146, and are selected to result in the non-inverting input on the amplifier 146 becoming positive with respect to its inverting input when the oil pressure switch between terminals 50 and 52 remains open for an excessive period of time after start up. A suitable discharging resistance 164 is connected between the normally open contact 166 of the switch 68 and the junction between the resistance 148 and the capacitance 154. The output of the amplifier 146 is connected by a series resistance 168 and a diode 170 to the non-inverting input of the amplifier 146 such as to provide a locking circuit for the amplifier 146 when its output goes high.

The outputs of the amplifiers 134, 136, 138 and 146 are connected to the anodes of respective diodes 172, 174, 176 and 178 which have their cathodes joined together at an "OR" junction 180 which is normally biased low by a resistance 182 connected between the junction 180 and the common junction 110. The emitter lead of a PNP Darlington pair 184 is connected to the junction of one end of a resistance 186 and the cathode of a zener diode 188; the other end of the resistance 186 being connected to the unijunction power voltage terminal 120, and the anode of the zener diode 188 being connected to the common junction 110. The base input of the Darlington pair 184 is connected by a resistance 190 to the anode of a diode 191 which has its cathode connected to the OR junction 180. A filtering capacitance 192 is connected between the anode of the diode 191 and the common junction 110. One end of a bias resistance 194 is connected to the junction between the resistance 190 and the capacitance 192, while the other end of the resistance 194 is connected to the cathode of a diode 196 which has its anode connected to the unipolarity power junction 122. The collector output of the Darlington pair 184 is connected by a resistance 198 to the base of a NPN switching transistor 200 which has its emitter connected to the junction 110. The base of the transistor 200 is connected by a bias resistance 202 to the common junction 110. A resistance 204 is connected between the collector of the transistor 200 and the junction 133 and has a value selected to produce a predetermined hysteresis effect in the thermal protective circuit 82, i.e., the resistance 204 has a value selected to change the voltage on the terminal 133 when the transistor 200 is conductive to cause the thermal responsive circuit to respond to a higher temperature sensed by the resistances 54, 56 and 58 than if the transistor 200 is non-conductive during a thermal or oil pressure shut-down. The collector of transistor 200 is also connected by line 206 to the emitter of an NPN transistor 208 having it collector connected by lead 210 to one end of the winding 104 which has its other end connected to the unipolarity power junction 120. A protective diode 212 is connected across the winding 104.

The primary winding 214 is the primary winding of a relatively small step-up transformer 216 which has its secondary winding 218 connected at one end to the common junction 110 and its other end to anode of a diode 220 in the delay after break circuit 86. The cathode of the diode 220 is connected by a resistance 222 to one plate of a capacitance 224 which has its other plate connected to the common junction 110. A load resistance 226 is connected across the secondary winding 218. The base of an NPN transistor 228 is connected by a resistance 230 to the junction between the capacitance 224 and the resistance 222. A resistance 232 connects the base of the transistor 228 to common junction 110 and has a value suitable to biasing the transistor 228 non-conductive. Resistances 234 and 236 are serially connected between the base of the transistor 228 and the unipolarity voltage junction 120. A junction between the collector of the transistor 228 and a load resistance 238 connected to the unipolarity power junction 120 is connected to the base of an NPN transistor 240 which has its emitter connected together with the emitter of the transistor 228 to the common junction 110. Diodes 242, 244 and 246 have their cathodes connected to the collector of the transistor 240 and have their anodes, respectively, connected to the line 162, to the junction between resistances 234 and 236, and to a junction 248 which is biased positive by a resistance 250 connected to the unipolarity power junction 120. The resistance 230 has a value selected to protect the base of the transistor 228 and to discharge the capacitance 224 through the resistance 232 in the event of loss of voltage from the voltage form the line 219. Resistances 234 and 236 have relatively high values to provide a slight bias which is sufficient to maintain transistor 228 conductive but sufficient to produce a relative sharp triggering of the transistor 228 into its conductive and non-conductive states by shunting such slight bias through diode 244 as well as to produce a hysteresis effect from the voltage on capacitance 224, i.e. the turn on voltage on capacitance 224 is substantially higher than the turn off voltage.

The cathode of a zener diode 252 is connected to the junction 248 while the anode of the diode 252 is connected to the common junction 110. A filter capacitance 254 is connected across the zener diode 252. One plate of a timing capacitance 256 is connected to the junction 248 while the other plate of the capacitance 256 is connected to one end of a timing resistance 258 which is connected at its other end of the common terminal 110. The junction between the capacitance 256 and the resistance 258 is connected to the gate electrode of an FET (N-channel junction field effect transistor) 260 which has its source and drain electrodes connected, respectively, to common terminal 110 and to one end of a load resistance 262 which is connected at its other end to the unpolarity power junction 120. The junction between the drain electrode of FET 260 and the resistance 262 is connected to the base of an NPN transistor 264 which has its emitter connected to the common junction 110. The collector of the transistor 264 is connected by a load resistance 266 to the unipolarity power junction 120. Diodes 268 and 270 have their cathodes joined to the collector of the transistor 264 while the anodes of the diodes 268 and 270 are connected, respectively, to the junction 248 and to an OR junction 272 between resistances 274 and 276 serially connected between the common terminal 110 and the unipolarity power junction 120. A diode 278 has its anode conneeteed to the junction 272 and its cathode connected to the base of the transistor 208.

In the low voltage protection circuit 88, a resistance 280 connects the unipolarity power junction 120 to one side of a filter capacitance 282 and to the cathode of a zener diode 284 at a regulated voltage junction 281. The other side of the capacitance 282 and the anode of the diode 284 are connected to the common junction 110. A first voltage dividing circuit includes a resistance 286 connected between the common terminal 110 and one end of a resistance 288 which has its other end connected to the anode of a zener diode 290 having its cathode connected to the regulated voltage junction 281. The junction between the resistors 286 and 288 is connected to the inverting input of an operational amplifier 292 which has its power inputs connected across the unipolarity power junction 120 and the common junction 110. The poweer junction 112 is connected to the cathode of a diode 294 which has its anode connected to a filter circuit which includes a capacitance 296 connected across the anode of the diode 294 and the common terminal 110 together with a series circuit of resistance 298 and a capacitance 300 connected from the anode of the diode 294 to the common terminal 294. The junction between the resistance 298 and the capacitance 300 is connected to one end of a second voltage dividing circuit including series resistances 302 and 304 the other end of which is connected to the regulated voltage terminal 281. The intermediate junction of the resistances 302 and 304 is connected to the non-inverting input of the operational amplifier 292.

The values of the capacitance 300 and the resistance 298 are selected to result in a time delay substantially less than the time delays of the timing capacitance 154 and resistance 148 of the oil pressure protection circuit 82 and of timing capacitance 256 and resistance 258 of the delay after the break circuit 86. Zener diode 290 has a voltage rating which is substantially less than the voltage rating of the diode 284, for example, the zener diode 284 has a rating of 12 while zener diode 290 has a rating of 6 volts to produce a first positive voltage on the inverting input of the operational amplifier 292. The values of resistances 286, 288, 302 and 304 are selected to apply a voltage to the non-inverting input of the amplifier 292 more positive than the positive voltage on the inverting input of the amplifier 292 when the voltage on the terminal 112 or across the capacitance 300 corresponds to a low voltage condition and to apply a voltage on the non-inverting input negative with respect to the voltage on the inverting input when the voltage across the capacitance 300 corresponds to an acceptable voltage condition.

The output of the operational amplifier 292 is connected by a resistance 306 to the base of an NPN transistor 308 which has its emitter connected to the common terminal 110 and its collector connected to the cathode of a diode 310 having its anode joined to the OR junction 272. A filtering capacitance 312 and a bias resistance 314 are connected in parallel across the base and emitter electrodes of the transistor 308. A resistance 316 is connected from the collector of the transistr 308 to the inverting input of the operational amplifier 292 and has a value selected in conjunction with the value of the resistances 286 and 288 to slightly increase the voltage on the inverting input of the operational amplifier 292 when the transistor 308 is non-conductive to provide for a hysteresis effect in the operation of the low voltage protection circuit 88.

In operation of the protection system of FIG. 1 the energization of the motor 10 is controlled by the contactor winding 26 in response to the thermostatically controlled contacts 44 and electrical protective unit 32. Normally the unit 32 completes conductive paths from terminal 34 to both terminals 30 and 70. Operation of the thermostatic contacts 44 in response to a demand for cooling operates the solenoid 46 to open the valve in the suction line to the compressor allowing the low pressure switch contacts 28 to close thus energizing the contactor winding 26. Upon satisfaction of the demand for cooling the thermostatic contacts 44 deoperate the solenoid 46 to close the valve in the suction line to compressor thus allowing the compressor to pump down its suction input to open the contacts 28 and thus de-energize the contactor winding 26 and the motor 10. In the event of an excessive high pressure in the output of the compressor, the contacts 36 open to de-energize the contactor winding 26.

Generally in the circuit unit 32, as shown in FIGS. 2A and 2B, the conductive state of load energization circuit 80 between the terminal 34 and the terminals 30 and 70 is controlled by the thermal protection circuit 82, the oil pressure protection circuit 84, the delay after break circuit 86, and the voltage protection circuit 88. The thermal sensing circuit 82 is responsive to one or more thermal sensing resistances 54, 56 and 58 sensing an excessively high temperature in the motor winding of the motor 10. The oil pressure pritection circuit 84 senses an open condition of the oil pressure switch 48 indicating insufficient oil pressure for an excessively long duration. The delay after break circuit 86 delays reenergization of the motor 10 for a predetermined duration after termination of the enerigization of the motor 10. The low voltage protection circuit 88 responds to an excessively low line voltage to the motor 10.

Conduction in the circuit 80 is controlled by the triac 90 which in turn is energized by relay contacts 102 operated by the energization of winding 104 through transistors 200 and 208. The conductive states of the transistors 200 and 208 are controlled by the voltage on the OR junctions 180 and 272. Normally the junction 180 is held low by the connection through resistance 182 to the common terminal 110 which renders the Darlington pair 184 and the transistor 200 conductive. The junction 272 is normally high due to the bias from resistances 274 and 276 to render the transistor 208 conductive. The relay winding 104 is energized only when both of the transistors 200 and 208 are conductive. In the event that a high is applied through any of diodes 172, 174, 176 and 178 to the junction 180 or a low is applied to the junction 272 through one of the diodes 270 and 310, the respective transistor 200 and 208 is rendered non-conductive which terminates energization of the winding 104 and thus terminates the conductive path through the triac 90 in the load circuit 80.

In the terminal sensing circuit 82 at normal temperatures, the junctions 60, 62 and 64 are positive with respect to the junction 133 to produce low outputs on the amplifiers 134, 136 and 138. In the event that one or more of the resistances 54, 56 and 58 senses an excessively high temperature, the respective terminals 60, 62 and 64 become low with respect to the terminal 133 producing high outputs on the respective amplifiers 134, 136 and 138. Current through the resistance 204 when the transistor 200 is conductive renders the thermal protective circuit 82 responsive only to a high temperature sensed by the resistances 54, 56 and 58 while when the transistors 200 is not conductive the circuit 82 responds to a lower temperature sensed by the resistances 54, 56 and 58; thus once the protective circuit has been terminated by sensing a high temperature condition or an oil pressure failure the motor must be cooled down to the lower temperature in order to allow restart.

In the oil protection circuit 84 the timing capacitance 154 is normally maintained at a substantially discharged condition by the closing of the oil pressure switch 48, FIG. 1, across the terminals 50 and 52. In the event that the oil pressure switch across the terminals 50 and 52 opens, the capacitance 154 charges from current through the amplifier 146 high after duration to thus produce a high on junction 180. During operation of the delay after break circuit 86 a low on line 162 maintains the capacitance 154 in a discharged condition to prevent triggering of the oil pressure protective circuit during the delay of the circuit 86. Once the output of the amplifier 146 has become high, current through the resistance 168 maintains the capacitance 154 in a charged condition even though the oil pressure switch 48 subsequently closes or the line 162 goes low. The oil pressure protection circuit is reset by depressing the switch 68 to discharge the capacitance 154.

In the delay after break circuit 86 current in the load circuit 80 either passes through the primary winding 214 (if the current is small) or generates sufficient voltage across the conducting diodes 92 and 94 (if the current is relatively large) to produce a voltage on the secondary winding which is rectified by diode 220 and applied to the capacitance 224. The transistor 228 is held conductive while the transistor 240 is held non-conductive producing a high on line 162 as well as on junction 248. The high on the junction 248 charges the capacitance 256 through the resistance 258. The gate of FET 260 is held only slightly positive by leakage current to render the FET conductive and maintain the transistor 264 non-conductive. When current in the load switching circuit 80 terminates, the voltage on the capacitance 224 discharges through resistances 230 and 232 to render the transistor 228 non-conductive and the transistor 240 conductive. A low is applied to line 162 and to the junction 248 which drives the gate of the FET negative rendering the FET 260 non-conductive. The drain of the FET 260 goes high rendering the transistor 264 conductive applying a low to the junction 272. The diode 268 insures fast triggering of the FET into its non-conductive state by shunting the junction 248 through the transistor 264. Once the charge on the capacitance 256 is dissipated sufficiently by discharging through the resistance 258, the FET 260 becomes conductive which in turn renders the transistor 264 non-conductive to remove the low applied to the junction 272 by the transistor 264.

It is noted that the use of only the positive half cycle of the AC output of the transformer 105 for power to the circuits 82, 84, 86 and 88 prevents loading and thus variation of the negative half cycle. Thus the negative half cycle has a magnitude which can be sensed to provide for abnormal line voltage protection.

In the low voltage protection circuit 88, the negative half-wave output of the primary winding 108 of the transformer 105 is rectified by diode 294, filtered by the capacitance 296 and applied to the resistance 298 to the capacitance 300. When the magnitude of the voltage on the terminals 29 and 38, FIG. 1, is sufficiently high, the negative voltage on the capacitance 300 lowers the voltage on the intermediate junction between resistances 302 and 304 to a voltage less than the voltage on the intermediate junction between the resistances 286 and 288. Power for the rest of the low voltage protection circuit 88 is applied from the line 120 which receives the positive half-cycle power output of the secondary winding 108. The power is regulated and filtered by the capacitance 282 and the zener diode 284 to produce a regulated voltage on junction 28; thus the voltage on the junction between the resistances 286 and 288 is a standard voltage. When the line voltage is sufficiently high the output of the amplifier 292 is driven low by the voltage on its non-inverting input being negative with respect to its inverting input. Should the voltage on the capacitance 300 drop indicating that the line voltage has dropped to too low a level, the non-inverting input of the amplifier 292 goes positive with respect to its inverting input thus producing a positive output on the amplifier 292 to render the transistor 308 conductive and to produce a low on the OR junction 272. When the transistor 308 is rendered conductive the resistance 316 is connected in parallel with the resistance 286 thus rendering the inverting input of the amplifier 292 further negative; thus the line voltage must rise to a higher voltage that the voltage at which operation of the circuit 88 was initiated in order to deoperate the circuit 88 to again enable operation of the motor 10.

In the event that there is a power failure for a duration longer than the time for discharging the capacitance 256 in the delay after break circuit 86, the restoration of power to the circuit produces a positive voltage on the non-inverting input of the amplifier 292 relative to the inverting input of the amplifier 292 since the voltage drop across the zener diode 290 holds the inverting input of the amplifier 292 low until the voltage on the terminal 281 passes the voltage rating of the zener diode 290. This insures that the non-inverting input of the amplifier 292 immediately becomes positive with respect to the inverting input of the amplifier 292 during the initial stages of the restoration of power to the circuit to prevent restart of the motor until restoration is complete and the line voltage adequate.

Since many variations, modifications and changes in detail may be made to the presently described embodiment, it is intended that all matters in the foregoing description and shown in the accompanying drawings be interpreted as illustrative and not in a limiting sense.

What is claimed is:

1. A protection circuit for a device having input switching means for connecting the device to an AC source, said circuit comprising
   a lower power transformer having a primary winding and a secondary winding, said primary winding adapted to be coupled to the AC source,
   First half-wave rectifier means coupled to the secondary winding and responsive to one half of the AC power on the secondary winding for producing a first single polarity voltage,
   second half-wave rectifier means coupled to the secondary winding and responsive to the other half of the AC power on the secondary winding for producing a second single polarity voltage which has a magnitude corresponding to the voltage of the AC source,
   sensing means energized by the first half-wave rectifier means and having an input connected to the second half-wave rectifier means for sensig a deviation of the magnitude of the second single polarity voltage from a predetermined voltage, and
   means operated by the sensing means sensing the deviation for operating the switching means to disconnect the device from the AC source.

2. A protection circuit as claimed in claim 1 wherein the sensing means includes
   means connected to the first half-wave rectifier means for producing a regulated voltage,
   first and second voltage dividing circuits, said first voltage dividing circuit connected across the regulated voltage producing means, said second voltage dividing means connected across the regulated voltage producing means and the second half-wave rectifier means, and
   means responsive to a difference in the first and second voltage dividing circuits for operating the operating means.

3. A protection circuit as claimed in claim 2 wherein said first voltage dividing circuit includes a zener diode for maintaining a predetermined voltage drop in one side of the first voltage dividing circuit.

4. A protection circuit as claimed in claim 1 including delay means for delaying a voltage rise of the second half-wave rectifier means relative to the first half-wave rectifier means.

5. A protection circuit as claimed in claim 1 wherein
   said first half-wave rectifier means is responsive to the positive half of the AC power to produce a positive voltage;
   said second half-wave rectifier means includes a diode, a first resistance, and a first capacitance all serially connected across the secondary winding such as to produce a negative voltage on one side of the capacitance, said first resistance and first capacitance selected to produce a substantial delay in any rise of the voltage across the first capacitance with respect to the rise of the positive voltage in the first half-wave rectifier means;
   said sensing means including a second resistance, a second capacitance connected in series with the second resistance across the first half-wave rectifier means, a first zener diode connected acros the second capacitance to produce a regulated positive voltage on one side of the second capacitance, a third resistance, a fourth resistance, a second zener diode having a voltage rating less than said first zener diode, said thirdand fourth resistances and said zener diode connected serially in a first voltage dividing circuit with the second zener diode connected with the third resistance on one side of an intermediate junction of the first voltage dividing circuit to the one side of the second capacitance, a fifth resistance, a sixth resistance, said fifth and sixth resistances connected in a second voltage dividing circuit across the one sides of the first and second capacitances, and operational amplifier having inputs connected to the respective intermediate junction of the first voltage dividing circuits and the junction between the fifth and sixth resistances; and said operating means includes transistor means connected to the output of the operational amplifier.

6. A protection system for an electrical motor having inputs switching means adapted to control application of power from an AC source to the motor, said system comprising first protection means selected from the group consisting of thermal protection means, oil pressure protection means, and delay after break means;

a low power isolation transformer having a primary winding and a secondary winding, said primary winding adapted to be coupled to the AC source;

first half-wave rectifier means coupled to the secondary winding and responsive to one half the AC power on the secondary winding for producing a first single polarity voltage to energize the first protection means, second protection means including second half-wave rectifier means coupled to the secondary winding and responsive to the other half of the AC power on the secondary winding for producing a second single polarity voltage which has a magnitude corresponding to the voltage of the AC source, and sensing means energized by the first half-wave rectifier means and having input connected to the second half-wave rectifier means for sensing a deviation of the magnitude of the second single polarity voltage from a predetermined voltage; and means operated by either the first protection means or the sensing means of the second protection means for operating the input switching means to terminate the energization of the motor.

* * * * *